(12) United States Patent
Kurumisawa et al.

(10) Patent No.: US 7,421,141 B2
(45) Date of Patent: Sep. 2, 2008

(54) AUTOMATIC IMAGE CORRECTING CIRCUIT

(75) Inventors: Takashi Kurumisawa, Shiojiri (JP); Masayuki Hayashi, Shiojiri (JP)

(73) Assignee: Seiko Epson Corporation (JP)

( * ) Notice: Subject to any disclaimer, the term of this patent is extended or adjusted under 35 U.S.C. 154(b) by 426 days.

(21) Appl. No.: 11/204,988

(22) Filed: Aug. 17, 2005

(65) Prior Publication Data

US 2006/0045373 A1    Mar. 2, 2006

(30) Foreign Application Priority Data

Sep. 1, 2004    (JP)    ............................. 2004-254802

(51) Int. Cl.
*G06K 9/40* (2006.01)
(52) U.S. Cl. .................. 382/254; 358/487; 364/571.04
(58) Field of Classification Search ................ 382/254, 382/160, 228
See application file for complete search history.

(56) References Cited

U.S. PATENT DOCUMENTS

| | | | | |
|---|---|---|---|---|
| 4,991,111 A | * | 2/1991 | Crookshanks | ............... 382/254 |
| 4,991,127 A | * | 2/1991 | Crookshanks | ............... 382/274 |
| 5,175,802 A | * | 12/1992 | Crookshanks | ............... 382/278 |
| 5,590,222 A | * | 12/1996 | Kojima | ....................... 382/268 |
| 5,940,114 A | * | 8/1999 | Kataoka et al. | ............. 347/248 |
| 6,018,589 A | | 1/2000 | Hyodo | |
| 6,091,857 A | * | 7/2000 | Shaw et al. | ................. 382/251 |
| 6,201,618 B1 | * | 3/2001 | Yamamoto | ................... 358/487 |
| 6,404,928 B1 | * | 6/2002 | Shaw et al. | ................. 382/232 |
| 6,535,245 B1 | * | 3/2003 | Yamamoto | ............... 348/223.1 |
| 6,718,068 B1 | * | 4/2004 | Gindele et al. | ............. 382/254 |
| 2002/0118889 A1 | | 8/2002 | Shimizu | |
| 2004/0001639 A1 | * | 1/2004 | Ohno | ......................... 382/254 |
| 2004/0201782 A1 | * | 10/2004 | Murai et al. | ................ 348/700 |
| 2004/0247199 A1 | * | 12/2004 | Murai et al. | ................ 382/274 |

FOREIGN PATENT DOCUMENTS

| | | |
|---|---|---|
| JP | 07-050856 | 2/1995 |
| JP | 2002204353 | 7/2002 |
| JP | 2004-088190 | 3/2004 |
| JP | 2004-274641 | 9/2004 |
| JP | 2004-280433 | 10/2004 |
| JP | 2004-282376 | 10/2004 |
| JP | 2004-282377 | 10/2004 |
| JP | 2004-310671 | 11/2004 |

* cited by examiner

*Primary Examiner*—Jingge Wu
*Assistant Examiner*—Tsung-Yin Tsai
(74) *Attorney, Agent, or Firm*—Lowe Hauptman Ham & Berner, LLP

(57) ABSTRACT

A automatic image correcting circuit includes a plurality of image correcting blocks each of which has a sum data calculating unit calculating sum data based on gray-scale values of input image data and an image correcting unit correcting the input image data based on a statistical value, and a statistical value calculating unit that calculates the statistical value based on sum data outputted from the plurality of image correcting blocks.

8 Claims, 9 Drawing Sheets

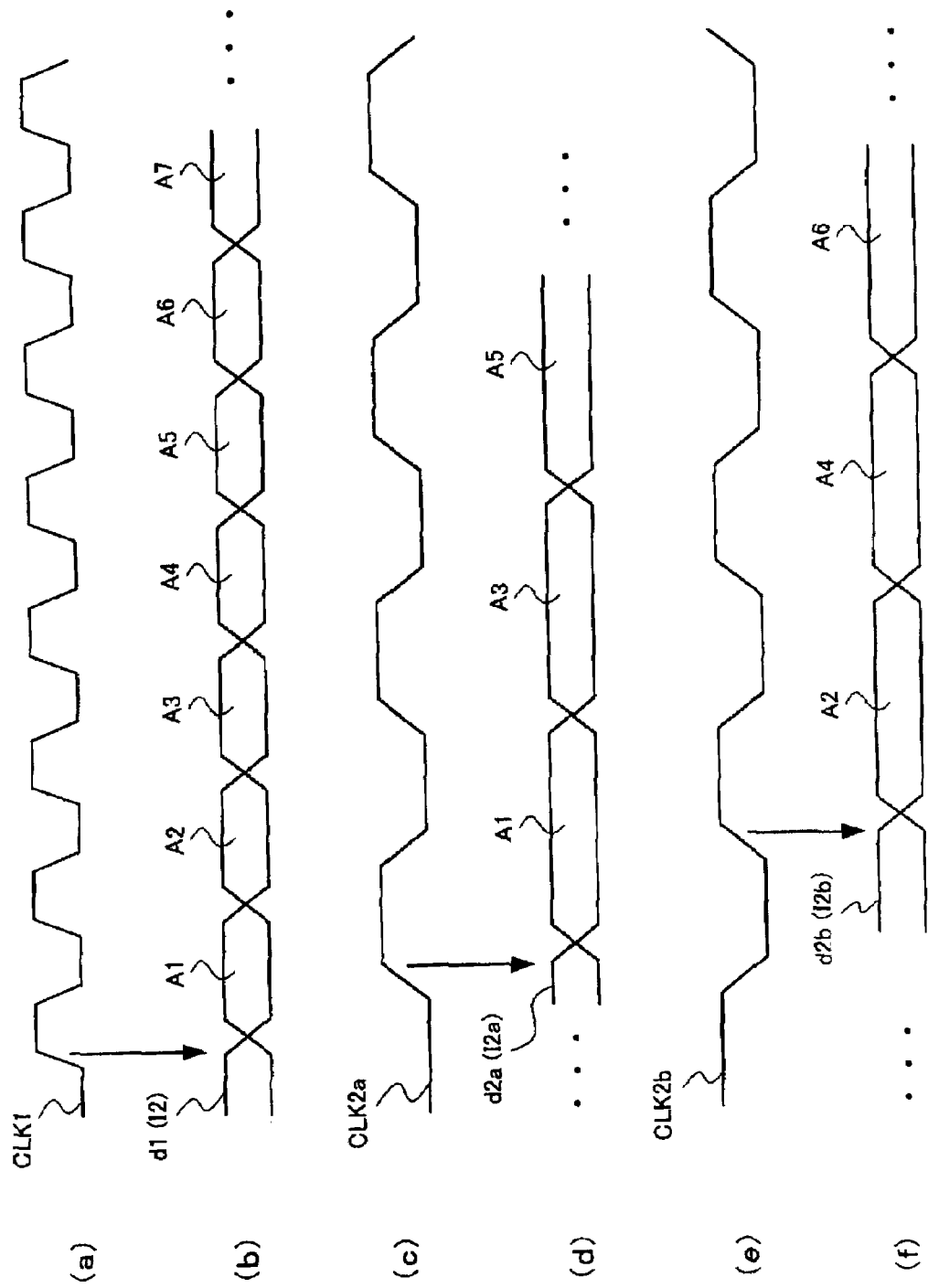

AUTOMATIC IMAGE CORRECTING CIRCUIT

RELATED APPLICATION

The present application is based on, and claims priority from, Japanese Application No. 2004-254802, filed Sep. 1, 2004, the disclosure of which is hereby incorporated by reference in its entirety.

BACKGROUND OF THE INVENTION

1. Technical Field

The present invention relates to an automatic image correcting circuit which automatically performs image correction on acquired image data.

2. Related Art

An automatic image correcting circuit that automatically performs image correction on input image data has been known. The automatic image correcting circuit is a circuit which calculates statistical values of luminance, color saturation, or the like of acquired image data and performs suitable image correction on the currently input image data using the statistical values. The automatic image correcting circuit enhances an image to be displayed by performing level correction, gamma correction, contrast correction, or the like as the image correction.

Here, in an image display device having a screen size of UXGA (1600 pixels×1200 pixels), high-speed image data is inputted, for example, with a dot clock of 165 MHz. However, since a processing speed of the automatic image correcting circuit is generally about 40 MHz, even when the automatic image correcting circuit is installed in the image display device as described above, the processing speed does not reach the data input speed. That is, for automatic image correction processing of high-speed image data, a processing speed four times as fast as the general processing speed of the automatic image correcting circuit is required. Accordingly, the automatic image correction processing of the high-speed image data cannot be achieved only by enhancing operation speed of a silicon wafer in the automatic image correcting circuit. Further, in the UXGA standard, there may be a case in which two groups of image data are inputted to two lines, respectively. Accordingly, it is unadvisable to perform processing by a processing circuit for only one block, like the automatic image correcting circuit of the related art.

SUMMARY

An advantage of the invention is that it provides an automatic image correcting circuit that automatically performs image correction, and more particularly, suitably performs image correction at high speed using a processing circuit for a plurality of blocks.

According to an aspect of the invention, an automatic image correcting circuit includes a plurality of image correcting blocks, each having a sum data calculating unit that calculates sum data based on a gray-scale value of input image data and an image correcting unit that corrects input image data based on a statistical value, and a statistical value calculating unit that calculates the statistical values based on sum data outputted from the plurality of image correcting blocks and supplies the statistical values to the plurality of image correcting blocks.

The above-described automatic image correcting circuit is a circuit that performs image correction on input image data of a still picture, a motion picture, or the like. The automatic image correcting circuit performs the image correction on the input image data by the plurality of image correcting blocks. Each image correcting block calculates a histogram, a sum of luminance, and a sum of color saturation (hereinafter, collectively referred to as 'sum data') based on a gray-scale value of input image data and performs the image correction on input image data based on the statistical values inputted from the statistical value calculating unit. The statistical value calculating unit calculates the statistical values based on sum data calculated by the respective image correcting blocks. As described above, the automatic image correcting circuit performs the image correction on input image data by the plurality of image correcting blocks, such that the image correction can be performed at high speed.

In the automatic image correcting circuit according to the aspect of the invention, it is preferable that the statistical value calculating unit calculate the statistical values by totaling sum data outputted from the plurality of image correcting blocks.

According to this configuration, the statistical value calculating unit calculates the statistical values by totaling sum data calculated by the plurality of image correcting blocks and supplies the statistical values to the respective image correcting blocks. That is, the automatic image correcting circuit performs the image correction based on the statistical values obtained by totaling sum data so as to be equal to each other. Accordingly, even when the automatic image correcting circuit performs the image correction on input image data by the plurality of image correcting blocks, a difference in image correction dose not occur in an image to be displayed. For example, as for the image to be displayed, there is no possibility that a stripe appears in the boundary of image data corrected by different image correcting blocks.

In the automatic image correcting circuit according to the aspect of the invention, it is preferable that the statistical value calculating unit calculate statistical values based on respective sum data outputted from the plurality of image correcting blocks and supply the statistical values to the plurality of image correcting blocks, respectively.

According to this configuration, the statistical value calculating unit calculates the statistical values based on respective sum data outputted from the plurality of image correcting blocks and supplies the plurality of calculated statistical values to the corresponding image correcting blocks. That is, the plurality of calculated statistical values are values based on sum data calculated from the plurality of image correcting blocks, respectively. Specifically, the statistical values to be inputted to the plurality of image correcting blocks are different from one another. For example, in a case in which input image data have different image data, the plurality of image correcting blocks perform the image correction using the statistical values calculated from different image data, respectively. Accordingly, the automatic image correcting circuit can perform the image correction suitable for properties or contents of different image data.

In the automatic image correcting circuit according to the aspect of the invention, it is preferable that the statistical value calculating unit is operated in a statistical value totaling mode or a statistical value independent mode according to an external control signal. In the statistical value totaling mode, the statistical value calculating unit may calculate the statistical values by totaling sum data outputted from the plurality of image correcting blocks and supplies the statistical values to the plurality of image correcting blocks. Further, in the statistical value independent mode, the statistical value calculating unit may calculate the statistical values based on sum data outputted from the plurality of image correcting blocks independently and supplies the statistical values to the corresponding image correcting blocks.

According to this configuration, the automatic image correcting circuit performs the image correction according to the control signal from the outside. The control signal is a signal including information on the properties or contents of input image data, such as information designating a simultaneous multi-screen image display in a video phone or the like. Accordingly, the automatic image correcting circuit can perform the image correction suitable for the properties or contents of input image data.

In the automatic image correcting circuit according to the aspect of the invention, it is preferable that the statistical value calculating unit calculate the statistical values by totaling sum data outputted from some of the plurality of image correcting blocks.

According to this configuration, the automatic image correcting circuit can perform the image correction on all input image data using the statistical values obtained by totaling sum data outputted from some of the plurality of image correcting blocks. For example, in a case in which the image correction needs to be effectively performed, in particular, on some of image data included in input image data, the automatic image correcting circuit can perform suitably the image correction on some of image data, without being influenced by the statistical values calculated from other image data of input image data. Further, in a case in which input image data is changed a little over the entire screen, the automatic image correcting circuit can perform the image correction on all image data using the statistical values calculated from some of image data, instead of sum data and the statistical values calculated from all image data.

It is preferable that the sum data calculating unit calculate sum data based on the gray-scale value in a sampling area, which includes some of input image data. The automatic image correcting circuit can perform the processing promptly by calculating sum data and the statistical values based on only the gray-scale value in the sampling area, which includes some of input image data.

Further, the automatic image correcting circuit may further include an image dividing unit that divides image data acquired from an outside into a plurality of input image data and supplies the plurality of input image data to the plurality of image correcting blocks. For example, the image dividing unit can supply alternately input image data to the plurality of image correcting blocks or supply image data, which are obtained by dividing acquired image data into an upper half and a lower half of a screen, to the plurality of image correcting blocks.

The above-described automatic image correcting circuit can be suitably applied to an electronic apparatus having an image display unit.

BRIEF DESCRIPTION OF THE DRAWINGS

The invention will be described with reference to the accompanying drawings, wherein like numbers reference like elements, and wherein:

FIG. 4A is a timing chart of image data and a clock signal to be inputted to image correcting blocks;

FIG. 4B is a timing chart of image data and a clock signal to be inputted to image correcting blocks;

FIG. 4C is a timing chart of image data and a clock signal to be inputted to image correcting blocks;

FIG. 4D is a timing chart of image data and a clock signal to be inputted to image correcting blocks;

FIG. 4E is a timing chart of image data and a clock signal to be inputted to image correcting blocks;

FIG. 4F is a timing chart of image data and a clock signal to be inputted to image correcting blocks;

DESCRIPTION OF THE EMBODIMENTS

Hereinafter, preferred embodiments of the invention will be described with reference to the drawings.

Configuration of Automatic Image Correcting Circuit

Figure 1:
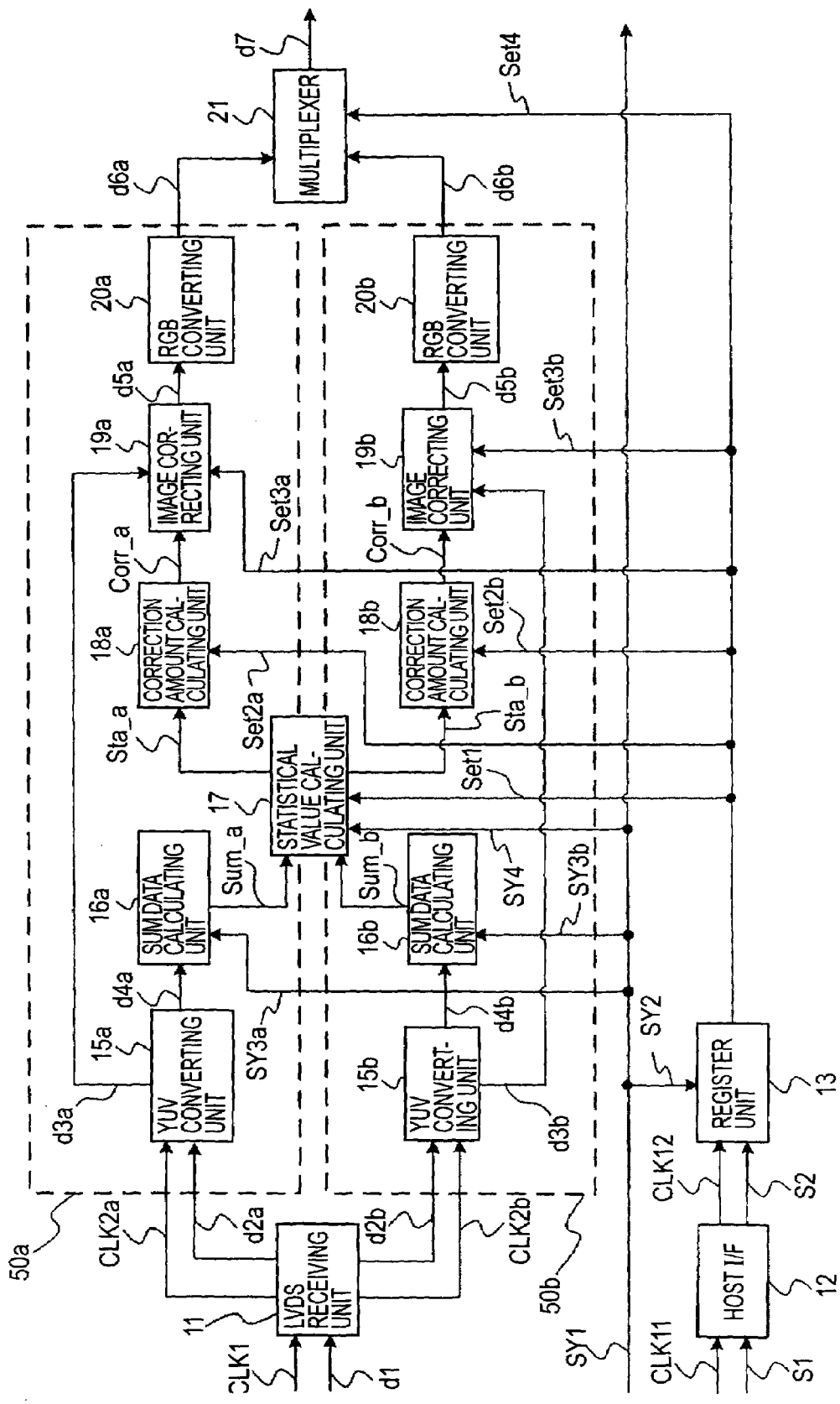
FIG. 1 is a diagram showing a schematic configuration of an automatic image correcting circuit according to an embodiment of the invention.

Now, an automatic image correcting circuit 100 according to an embodiment of the invention will be described with reference to FIG. 1. FIG. 1 is a block diagram showing the schematic configuration of the automatic image correcting circuit 100.

The automatic image correcting unit 100 primarily includes an LVDS (Low Voltage Differential Signal) receiving unit 11, a host I/F 12, a register unit 13, a statistical value calculating unit 17, image correcting blocks 50a and 50b, and a multiplexer 21.

The automatic image correcting circuit 100 acquires image data, such as a still picture or a motion picture, and automatically performs image correction on image data for each frame. The automatic image correcting circuit 100 primarily performs the image correction for enhancing an image to be displayed. Moreover, the automatic image correcting circuit 100 can be installed in an electronic apparatus or the like that has an image display unit. For example, in a cellular phone or a portable terminal, which has a liquid crystal panel as the image display unit, the automatic image correcting circuit 100 can be provided in an image processing unit, which supplies display image data to the image display unit, a driver of the liquid crystal panel, or the like. Further, the automatic image correcting circuit 100 acquires a synchronizing signal SY1 (including a vertical synchronizing signal and a horizontal synchronizing signal) from a CPU included in the electronic apparatus and a processing unit in the automatic image correcting circuit 100 performs processing with a timing corresponding to the synchronizing signal SY1. The synchronizing signal SY1 is also supplied to the above-described image display unit.

The LVDS receiving unit 11 acquires, from the outside, image data d1 to be processed by the automatic image correcting circuit 100 and a clock signal CLK1 serving as a reference when the processing is performed in the automatic image correcting circuit 100. In a case in which image data d1 is inputted at high speed, if the LVDS receiving unit 11 outputs data with a full swing voltage, electromagnetic interference (EMI) occurs. For this reason, the LVDS receiving unit 11 outputs data with a reduced swing voltage. Moreover, image data d1 to be inputted is RGB-format data, for example, data of 24 bits per pixel.

The LVDS receiving unit 11 divides image data d1 to be inputted and supplies the divided image data d2a and image data d2b to the image correcting blocks 50a and 50b, respectively. Further, the LVDS receiving unit 11 also supplies clock signals CLK2a and CLK2b to the image correcting blocks 50a and 50b. As described above, the LVDS receiving unit 11 functions as an image dividing unit.

Moreover, the LVDS receiving unit 11 can acquire image data divided into two groups from two lines. In this case, the LVDS receiving unit 11 supplies image data d2a and d2b to the image correcting blocks 50a and 50b, without dividing the image data. Further, the automatic image correcting circuit 100 is not limited to the configuration in which a single LVDS receiving unit 11 acquires image data d1. For example, the automatic image correcting circuit 100 may have a configuration in which a plurality of LVDS receiving units 11 acquire image data divided into a plurality of groups.

The host I/F 12 acquires, from the outside (for example, the CPU in the electronic apparatus in which the automatic image correcting circuit 100 is installed), a set value S1 to be used when the image correction is performed and a clock signal CLK11 to be used when the set value is recorded. A set value, which is information for determining an image correction range, an image correction intensity (level), or the like, is not changed unless it is changed by a user or the like. The set value S1 corresponds to a new set value changed by the user or the like. The host I/F 12 records the changed new set value S1 in the register unit 13 using the clock signal CLK11. In this case, the host I/F 12 supplies a set value S2 and a clock signal CLK12 to the register unit 13.

The register unit 13 acquires the set value S2 and the clock signal CLK12 from the host I/F 12 and simultaneously acquires a synchronizing signal SY2. The synchronizing signal SY2 is also supplied from the CPU in the electronic apparatus in which the automatic image correcting circuit 100 is installed. The register unit 13 includes a register and stores the above-described set value in the register. Then, the register unit 13 outputs the stored set value with the timing of the supplied synchronizing signal SY2. Further, when the set value is changed by the user or the like, the register unit 13 acquires the changed new set value S2 with the timing of the clock signal CLK12 supplied from the host I/F 12. In this case, the register unit 13 outputs the changed new set value S2 with the timing of the synchronizing signal SY2, not with the timing of the clock signal CLK12. Accordingly, there is no case in which the image correction is performed on image data of one frame with different set values. The register unit 13 outputs the set value to a plurality of processing units in the image correcting blocks 50a and 50b and to the multiplexer 21.

The automatic image correcting circuit 100 according to the present embodiment performs the image correction on image data d2a and d2b divided into two groups by two blocks, that is, the image correcting block 50a and the image correcting block 50b. In other words, the automatic image correcting circuit 100 performs the image correction on the acquired image data d1 using a plurality of blocks. Specifically, the image correcting block 50a and the image correcting block 50b calculate the histogram of a gray-scale value, the sum of luminance, and the sum of color saturation (that is, 'sum data') for image data d2a and d2b, respectively, and supply the sum data to the statistical value calculating unit 17. The statistical value calculating unit 17 calculates statistical values of image data from sum data and supplies the calculated statistical values to the image correcting blocks 50a and 50b, respectively. Then, the image correcting block 50a and the image correcting block 50b calculate the correction amount based on the statistical values supplied from the statistical value calculating unit 17 and perform image correction on the image data using the correction amount. Image data d6a and d6b, which are subjected to the image correction by the image correcting block 50a and the image correcting block 50b are supplied to the multiplexer 21. A detailed image processing in the image correcting blocks 50a and 50b will be described below.

The multiplexer 21 collects two image data d6a and d6b to generate image data d7 and outputs generated image data d7 to the image display unit (an LCD panel or the like), which is not shown. In this case, the multiplexer 21 performs the processing based on a set value Set4 supplied from the register unit 13. Then, the image display unit (not shown) displays image data d7 supplied from the multiplexer 21.

In addition, the automatic image correcting circuit 100 may output two image data d6a and d6b to the image display unit, without collecting the two image data d6a and d6b. In this case, the automatic image correcting circuit 100 does not need to have the multiplexer 21, and image data d6a and d6b outputted from the image correcting blocks 50a and 50b are supplied to the image display unit as they are.

Next, the image processing performed in the image correcting blocks 50a and 50b and the statistical value calculating unit 17 will be described in detail.

The image correcting block 50a has a YUV converting unit 15a, a sum data calculating unit 16a, a correction amount calculating unit 18a, an image correcting unit 19a, and an RGB converting unit 20a. Similarly, the image correcting block 50b has a YUV converting unit 15b, a sum data calculating unit 16b, a correction amount calculating unit 18b, an image correcting unit 19b, and an RGB converting unit 20b.

Image data d2a and d2b and the clock signals CLK2a and CLK2b are inputted to the YUV converting units 15a and 15b, respectively. The YUV converting units 15a and 15b convert image data d2a and d2b from an RGB-format to a YUV format (YUV conversion). The YUV converting units 15a and 15b supply YUV-converted image data d3a and d3b to the image correcting units 19a and 19b and YUV-converted image data d4a and d4b to the sum data calculating units 16a and 16b. Moreover, the YUV converting units 15a and 15b can supply data extracted from some of the screen (a sampling area described below) to the sum data calculating units 16a and 16b as image data d4a and d4b.

The sum data calculating units 16a and 16b calculate sum data regarding acquired image data d4a and d4b. Specifically, the sum data calculating units 16a and 16b generate the histogram of the gray-scale values and simultaneously calculate the sum of luminance and the sum of color saturation. In addition, the sum data calculating units 16a and 16b perform the above-described processing in a frame period with the timings of the synchronizing signals SY3a and SY3b to be supplied thereto. Sum data Sum_a and Sum_b acquired in such a manner are outputted to the statistical value calculating unit 17. As described above, the sum data calculating units 16a and 16b function as a sum data calculating unit.

The statistical value calculating unit 17 calculates the statistical values of luminance and color saturation of image data d4a and d4b based on the acquired sum data Sum_a and Sum_b. Specifically, the statistical value calculating unit 17 calculates the maximum and minimum values of luminance, the average values of luminance and color saturation, and the standard deviation of luminance, as the statistical values. The statistical value calculating unit 17 performs the above-described processing with the timing of a synchronizing signal SY4 to be supplied thereto and simultaneously performs the processing after the processing for one frame by the sum data calculating units 16a and 16b ends.

In addition, the statistical value calculating unit 17 calculates statistical values Sta_a and Sta_b from sum data Sum_a and Sum_b based on a signal Set1 supplied from the register unit 13. Specifically, the signal Set1 includes mode information representing whether the statistical value calculating unit 17 sets sum data Sum_a and Sum_b outputted from the sum data calculating units 16a and 16b to the statistical values to be used in the next-stage image correcting units 19a and 19b (hereinafter, referred to as 'statistical value independent mode') or sets the sum of sum data Sum_a and Sum_b to the statistical value to be used in the image correcting units 19a and 19b (hereinafter, referred to as 'statistical value totaling mode'). When the signal Set1 represents the statistical value totaling mode, the statistical value calculating unit 17 outputs the value obtained by totaling the statistical values calculated from sum data Sum_a and Sum_b as the statistical value. In this case, the statistical values Sta_a and Sta_b outputted from the statistical value calculating unit 17 are the same. That is, the statistical values obtained by totaling sum data so as to be equal to each other are used for the image correction. Therefore, even when the statistical values calculated separately by the image correcting blocks 50a and 50b are different from each other, a difference in image correction performed by the image correcting blocks 50a and 50b does not occur. That is, even when image correction of the divided image data is performed by the plurality of blocks, the automatic image correcting circuit 100 performs the image correction of respective image data based on the same statistical value, and thus there is no case in which a stripe occurs in the boundary of the divided image data.

On the other hand, when the signal Set1 represents the statistical value independent mode, the statistical value calculating unit 17 outputs statistical values calculated from image data Sum_a and Sum_b to the image correcting units 19a and 19b, respectively. That is, the statistical value calculating unit 17 does not total the respective statistical values of sum data Sum_a and Sum_b. Accordingly, the statistical values Sta_a and Sta_b outputted from the statistical value calculating unit 17 are different from each other. For example, in a case in which a transmitting-side image and a receiving-side image are simultaneously displayed in a video phone or the like (that is, in a case in which a plurality of screens are simultaneously displayed), the statistical values Sta_a and Sta_b calculated from two image data are used for the image correction as they are, without being totaled. Therefore, the automatic image correcting circuit 100 can perform proper image correction on the transmitting-side image and the receiving-side image. As described above, the statistical value calculating unit 17 functions as a statistical value calculating unit.

Moreover, whether the statistical value calculating unit 17 is set by the signal Set1 in the statistical value totaling mode or in the statistical value independent mode is determined by a CPU of an electronic apparatus or the like, in which the automatic image correcting circuit 100 is installed, according to the properties, contents, and the like of a target image of the automatic image correcting circuit 100, such that the CPU supplies a signal representing the set mode to the host I/F 12. For example, the CPU supplies a mode specifying signal specifying the statistical value totaling mode to the host I/F 12 when one image data is generally displayed, and supplies a mode specifying signal specifying the statistical value independent mode to the host I/F 12 when two different and independent image data are simultaneously displayed, such as in the video phone or the like. The host I/F 12 supplies a register value corresponding to the mode specifying signal to the register unit 13 and the register unit 13 supplies the register value to the statistical value calculating unit 17 as the signal Set1.

The statistical values Sta_a and Sta_b calculated in such a manner are supplied to the correction amount calculating units 18a and 18b, respectively. The correction amount calculating units 18a and 18b calculate correction intensity (that is, correction amount) with respect to image data based on the acquired statistical values Sta_a and Sta_b. Specifically, the correction amount calculating units 18a and 18b calculate a level correction coefficient, a gamma correction amount, a contrast correction amount, and a color saturation correction amount. Signals Corr_a and Corr_b corresponding to the correction amount calculated in such a manner are outputted to the image correcting units 19a and 19b, respectively. Moreover, the correction amount calculating units 18a and 18b calculate the correction amount and simultaneously perform the scene detection with respect to image data. Further, the correction amount calculating units 18a and 18b calculate the statistical values based on set values Set2a and Set2b supplied from the register unit 13, respectively.

The image correcting units 19a and 19b are supplied with set values Set3a and Set3b supplied from the register unit 13, the correction amounts Corr_a and Corr_b supplied from the correction amount calculating units 18a and 18b, and image data d3a and d3b subjected to the YUV conversion by the YUV converting units 15a and 15b, respectively. The image correcting units 19a and 19b perform the image correction on image data d3a and d3b based on the correction amounts Corr_a and Corr_b and the set values Set3a and Set3b. Specifically, the image correcting units 19a and 19b perform the level correction, the gamma correction, the contrast correction, and the color saturation correction on the image data d3a and d3b. Image data d5a and d5b subjected to the image correction in such a manner are outputted to the RGB converting units 20a and 20b, respectively. As described above, the image correcting units 19a and 19b function as an image correcting unit.

The RGB converting units 20a and 20b convert image data d5a and d5b to be supplied from the YUV format to the RGB-format (that is, 'RGB conversion'), respectively. The RGB converting units 20*a* and 20*b* supply image data d6*a* and d6*b* subjected to the RGB conversion to the multiplexer 21. Then, the multiplexer 21 collects two image data d6*a* and d6*b* to output one image data d7.

As such, in the automatic image correcting circuit 100 according to the present embodiment, the image correction is performed by the plurality of blocks, such that image data having a large amount of information can be processed at high speed. In addition, the automatic image correcting circuit 100 performs the image correction using the value obtained by totaling the statistical values calculated by the respective blocks when the operation mode of the statistical value calculating unit 17 is set in the statistical value totaling mode. Therefore, as for the image to be displayed, a difference in image correction among the divided images does not occur. On the other hand, the automatic image correcting circuit 100 performs the proper image correction separately on the divided images using the statistical values calculated by the respective blocks when the operation mode of the statistical value calculating unit 17 is set in the statistical value independent mode. By doing so, the automatic image correction circuit 100 can perform the proper image correction by the plurality of image correcting blocks in the mode corresponding to input image data.

Image Correction Method

An image correction method, which is performed by the automatic image correcting circuit 100 according to the present embodiment, will now be described with reference to FIGS. 2A to 6C.

First Image Correction Method

Figure 2A:
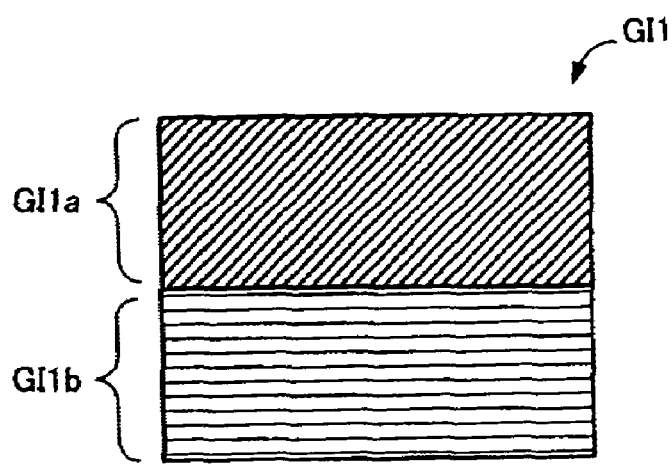
FIG. 2A is a diagram illustrating a first image correction method.
Figure 2B:
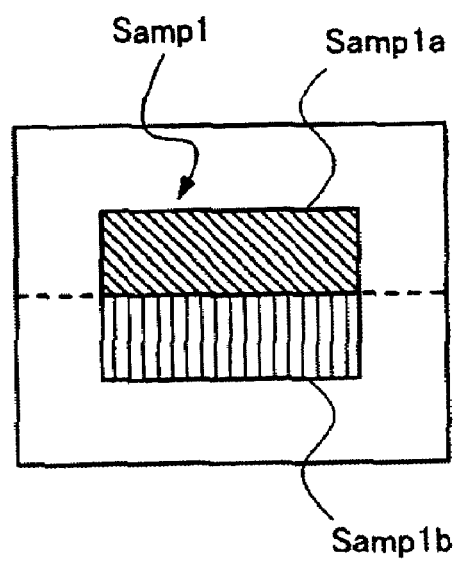
FIG. 2B is a diagram illustrating the first image correction method.
Figure 2C:
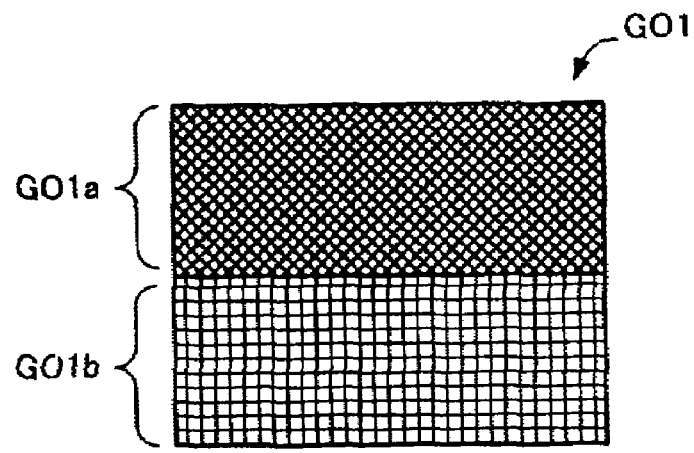
FIG. 2C is a diagram illustrating the first image correction method.

FIGS. 2A to 2C are diagrams illustrating a first image correction method. FIG. 2A shows image data GI1 (corresponding to image data d1 in FIG. 1) to be inputted to the automatic image correcting circuit 100. Specifically, image data GI1 is divided into image data GI1*a* and image data GI1*b* such that one screen is divided into two parts, that is, an upper part and a lower part. In this case, image data GI1*a* is inputted to the image correcting block 50*a* and image data GI1*b* is inputted to the image correcting block 50*b*. In the present example, since image data of one screen is processed by the two image correcting blocks 50*a* and 50*b*, the statistical value calculating unit 17 is operated in the statistical value totaling mode.

FIG. 2B shows a target region Samp1 of the calculation of the statistical value (hereinafter, simply referred to as 'sampling area'), which is used when the image correcting blocks 50*a* and 50*b* perform the image correction. The sampling area Samp1 is composed of sub sampling areas Samp1*a* and Samp1*b*. In this case, the sum data calculating unit 16*a* of the image correcting block 50*a* calculates sum data Sum_a using image data in a sampling area Samp1*a* and supplies the calculated sum data Sum_a to the statistical value calculating unit 17. Further, the sum data calculating unit 16*b* of the image correcting block 50*b* calculates sum data Sum_b using image data in a sampling area Samp1*b* and supplies calculated sum data Sum_b to the statistical value calculating unit 17. The statistical value calculating unit 17 outputs the statistical values Sta_a and Sta_b, which are equal to each other, to the correction amount calculating units 18*a* and 18*b*, respectively, based on the sum of sum data Sum_a and Sum_b. That is, the image correcting blocks 50*a* and 50*b* perform the image correction based on the statistical value of the entire sampling area Samp1, respectively. Moreover, the sampling area Samp1 is set to only the central area of the image, not to the entire image, as shown in FIG. 2B. This is because an observer generally views the central area of the image and thus it is effective to perform the image correction based on image data of that region.

FIG. 2C shows image data GO1 outputted from the automatic image correcting circuit 100. Image data GO1 has image data GO1*a* and GO1*b*. Image data GO1*a* is image data disposed on an upper side of the screen and is subjected to the image correction by the image correcting block 50*a* (corresponding to image data d6*a* in FIG. 1). Image data GO1*b* is image data disposed on a lower side of the screen and is subjected to the image correction by the image correcting block 50*b* (corresponding to image data d6*b* in FIG. 1). Image data GO1*a* and GO1*b* are subjected to the image correction using the value obtained by totaling the statistical values calculated from the respective sampling areas Samp1*a* and Samp1*b*. Therefore, in image data GO1*a* and GO1*b*, a difference in image correction does not occur. For example, even when the luminance correction of image data GI1*a* and GI1*b* is performed based on different statistical values, there is no irregularity such as a stripe appearing in the boundary of image data GO1*a* and image data GO1*b* in FIG. 2C. Moreover, the automatic image correcting circuit 100 may output image data GO1*a* and GO1*b* obtained by dividing the screen into two parts, that is, the upper part and the lower part, to the image display unit as they are or may collect image data GO1*a* and GO1*b* using the multiplexer 21 to output one image data.

Second Image Correction Method

Next, a second image correction method will be described with reference to FIGS. 3A and 4F.

Figure 3A:
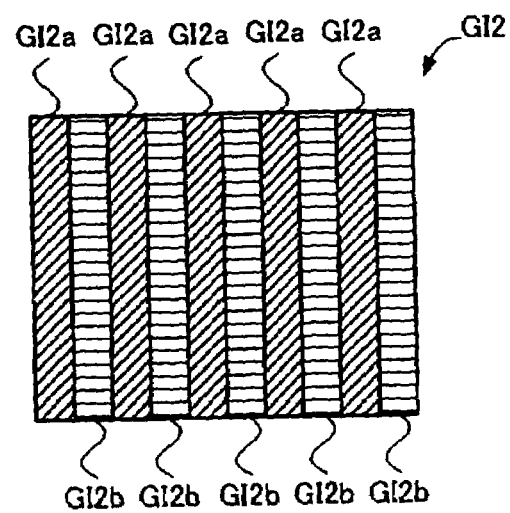
FIG. 3A is a diagram illustrating a second image correction method.
Figure 3B:
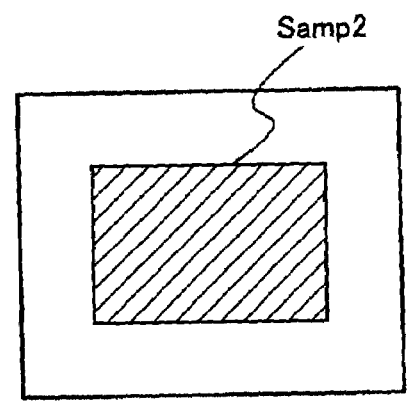
FIG. 3B is a diagram illustrating the second image correction method.
Figure 3C:
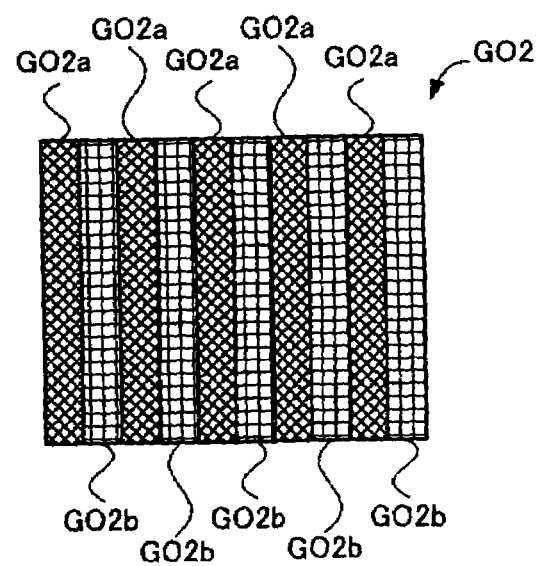
FIG. 3C is a diagram illustrating the second image correction method.

FIGS. 3A to 3C are diagrams illustrating a second image correction method. FIG. 3A shows image data GI2 (corresponding to image data d1 in FIG. 1) to be inputted to the automatic image correcting circuit 100. In this case, image data GI2 of one screen are inputted to the automatic image correcting circuit 100 and the LVDS receiving unit 11 supplies image data GI2*a* and GI2*b* (corresponding to image data d2*a* and d2*b* in FIG. 1), which are obtained by dividing image data GI2 into two parts, to the YUV converting units 15*a* and 15*b*, respectively. Specifically, the LVDS receiving unit 11 divides image data GI2 into two parts for each odd-numbered dot clock and each even-numbered dot clock. Image data GI2*a* corresponding to the odd-numbered dot clock is inputted to the image correcting block 50*a* and image data GI2*b* corresponding to the even-numbered dot clock is inputted to the image correcting block 50*b*. Moreover, in the present example, since image data of one screen is processed by the two image correcting blocks 50*a* and 50*b*, the statistical value calculating unit 17 is operated in the statistical value totaling mode.

Here, a manner in which divided image data GI2 is inputted to the image correcting blocks 50*a* and 50*b* will be described with reference to FIGS. 4A to 4F. FIGS. 4A to 4F are timing charts of image data and a clock signal to be inputted to the image correcting blocks 50*a* and 50*b*. FIG. 4A shows the clock signal CLK1 to be inputted to the LVDS receiving unit 11 and FIG. 4B shows image data d1 (corresponding to image data GI2) to be inputted to the LVDS receiving unit 11. Image data d1 is inputted to the LVDS receiving unit 11 with the timing of the clock signal CLK1. FIG. 4C shows the clock signal CLK2*a* to be inputted to the YUV converting unit 15*a* of the image correcting block 50*a* and FIG. 4D shows image data d2*a* (corresponding to image data GI2*a*) to be inputted to the YUV converting unit 15*a*. Image data d2*a* is inputted to the YUV converting unit 15*a* with the timing of the clock signal CLK2*a*. FIG. 4E shows the clock signal CLK2*b* to be inputted to the YUV converting unit 15b of the image correcting block 50b and FIG. 4F shows image data d2b (corresponding to image data GI2b) to be inputted to the YUV converting unit 15b. Image data d2b is inputted to the YUV converting unit 15b with the timing of the clock signal CLK2b.

As shown in FIG. 4B, image data d1 is inputted to the LVDS receiving unit 11 in an order of image data A1, image data A2 adjacent to image data A1, image data A3 adjacent to image data A3, . . . , image data A7 adjacent to image data A6, . . . . At this time, image data A1, image data A3, image data A5, . . . of image data d1 are inputted to the YUV converting unit 15a in that order, as shown in FIG. 4D. That is, data of image data d1 corresponding the odd-numbered dot clock are inputted to the image correcting block 50a. On the other hand, image data A2, image data A4, image data A6, . . . of image data d1 are inputted to the YUV converting unit 15b in that order, as shown in FIG. 4F. That is, data of image data d1 corresponding the even-numbered dot clock are inputted to the image correcting block 50b. As such, the image correcting blocks 50a and 50b acquire image data d2a and d2b, which are divided into data of the odd-numbered dot clock and data of the even-numbered dot clock, from the LVDS receiving unit 11.

Returning to FIGS. 3A to 3C, the description of the second image correction method will be resumed. FIG. 3B shows a sampling area Samp2 as a target of the calculation of the statistical value, which is used when the image correcting blocks 50a and 50b perform the image correction. Specifically, the image correcting unit 50a calculates sum data Sum_a using image data in the sampling area Samp2 corresponding to the odd-numbered dot clock and supplies calculated sum data Sum_a to the statistical value calculating unit 17. In addition, the sum data calculating unit 16b of the image correcting block 50b calculates sum data Sum_b using image data in the sampling area Samp2 corresponding to the even-numbered dot clock and supplies calculated sum data Sum_b to the statistical value calculating unit 17. The statistical value calculating unit 17 outputs the statistical values Sta_a and Sta_b, which are equal to each other, to the correction amount calculating unit 18a and 18b, respectively, based on the sum of sum data Sum_a and Sum_b. That is, the image correcting blocks 50a and 50b perform the image correction based on the statistical value of the entire sampling area Samp2, respectively.

FIG. 3C shows image data GO2 outputted from the automatic image correcting circuit 100. The image data GO2 has image data GO2a and GO2b. Image data GO2a is image data corresponding to the odd-numbered dot clock and is subjected to the image correction by the image correcting block 50a (corresponding to image data d6a in FIG. 1). Further, image data GO2b is image data corresponding to the even-numbered dot clock and is subjected to the image correction by the image correcting block 50b (corresponding to image data d6b in FIG. 1). Image data GO2a and GO2b are also subjected to the image correction using the value obtained by totaling the statistical values calculated from the sampling area Samp2. Therefore, the difference in image correction does not occur. For example, even when the luminance correction of image data GI2a and GI2b is performed based on different statistical values, there is no irregularity such as a stripe appearing in the boundary of image data GO2a and image data GO2b in FIG. 3C. Moreover, the automatic image correcting circuit 100 may output one image data, which is obtained by collecting image data GO2a and GO2b corresponding to the odd-numbered and even-numbered dot clocks by the multiplexer 21, to the image display unit, may output image data GO2a and GO2b to the image display unit as they are, without collecting image data GO2a and GO2b, or may output two image data obtained by dividing image data, which is obtained by collecting image data GO2a and GO2b, into two parts, that is, the upper part and the lower part of the screen.

Third Image Correction Method

Next, a third image correction method will be described with reference to FIGS. 5A to 5D.

Figure 5A:
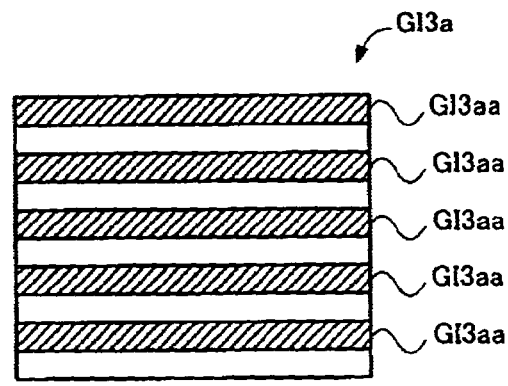
FIG. 5A is a diagram illustrating a third image correction method.
Figure 5B:
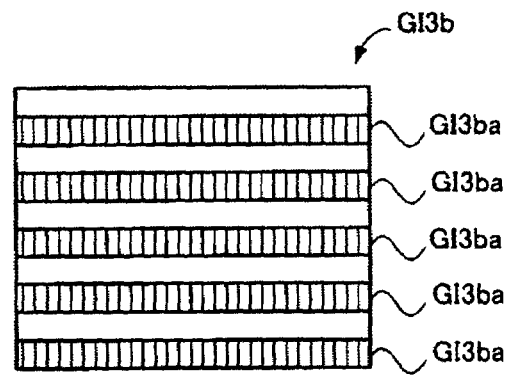
FIG. 5B is a diagram illustrating the third image correction method.

The third image correction method is an image correction method, which is performed when the automatic image correcting circuit 100 processes an NTSC signal used in a television image, or the like. In this case, the automatic image correcting circuit 100 acquires image data in an interlacing mode. Specifically, image data GI3a shown in FIG. 5A is first inputted to the automatic image correcting circuit 100 as a first field image. Image data GI3a has image data GI3aa of odd-numbered lines in a horizontal direction of the screen. After image data GI3a is inputted, image data GI3b shown in FIG. 5B is inputted to the automatic image correcting circuit 100 as a second field image. Image data GI3b has image data GI3ba of even-numbered lines in the horizontal direction of the screen. When image data are inputted in the interlacing mode, as described above, the LVDS receiving unit 11 divides image data GI3a and image data GI3b to be inputted thereto and supplies divided image data to the image correcting blocks 50a and 50b, respectively. For example, the LVDS receiving unit 11 alternately supplies image data GI3a as the first field image to the image correcting blocks 50a and 50b and then alternately supplies image data GI3b as the second field image to the image correcting blocks 50a and 50b. Moreover, in the present example, since image data of one screen are processed by the two image correcting blocks 50a and 50b, the statistical value calculating unit 17 is operated in the statistical value totaling mode.

Figure 5C:
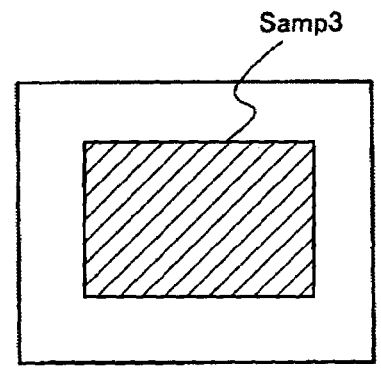
FIG. 5C is a diagram illustrating the third image correction method.

FIG. 5C shows a sampling area Samp3 as a target of the calculation of the statistical value, which is used when the image correcting blocks 50a and 50b perform the image correction. For example, the image correcting unit 50a calculates sum data Sum_a using image data in the sampling area Samp3 and supplies calculated sum data Sum_a to the statistical value calculating unit 17. In addition, the sum data calculating unit 16b of the image correcting block 50b calculates sum data Sum_b using image data in the sampling area Samp3 and supplies calculated sum data Sum_b to the statistical value calculating unit 17. The statistical value calculating unit 17 outputs statistical values Sta_a and Sta_b, which are equal to each other, to the correction amount calculating unit 18a and 18b, respectively, based on the sum of the sum data Sum_a and Sum_b. That is, the image correcting blocks 50a and 50b perform the image correction based on the statistical value of the entire sampling area Samp3, respectively.

Figure 5D:
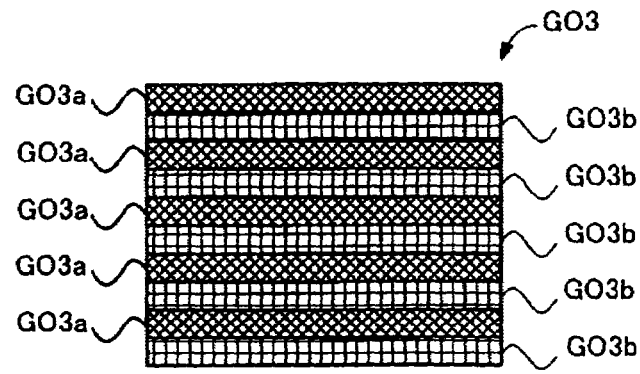
FIG. 5D is a diagram illustrating the third image correction method.

FIG. 5D shows image data GO3 outputted from the automatic image correction circuit 100. Image data GO3 has image data GO3a and GO3b. Image data GO3a and GO3b represent image data GI3a and GI3b after being processed by both the image correcting blocks 50a and 50b. The image correction of image data GO3a and GO3b is performed using the sum of the statistical values calculated by the respective image correcting blocks 50a and 50b. Therefore, even when the luminance correction of image data GI3a and GI3b is performed based on different statistical values, there is no irregularity such as a stripe appearing in the boundary of image data GO3a and GO3b in FIG. 5D.

Fourth Image Correction Method

Figure 6A:
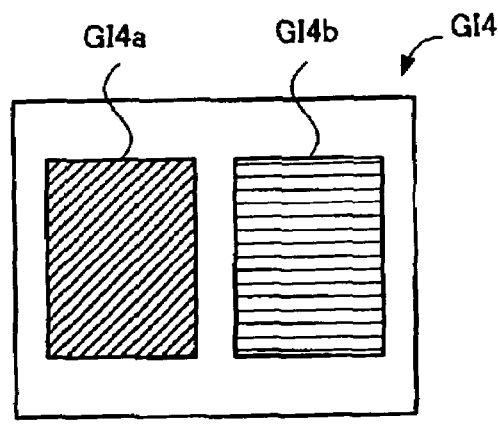
FIG. 6A is a diagram illustrating a fourth image correction method.

Next, a fourth image correction method will be described with reference to FIGS. 6A to 6C.

The fourth image correction method is an image correction method, which is performed, for example, when a simultaneous multi-screen display is performed. As the simultaneous multi-screen display, there may be a case in which receiving-side image data and transmitting-side image data are simultaneously displayed in the video phone or the like. Specifically, as shown in FIG. 6A, image data GI4 includes transmitting-side image data GI4a and receiving-side image data GI4b. Image data GI4a is inputted to the image correcting block 50a and image data GI4b is inputted to the image correcting block 50b. Moreover, in the present example, since image data of a plurality of different screens are processed by the two image correcting blocks 50a and 50b, the statistical value calculating unit 17 is operated in the statistical value independent mode.

Figure 6B:
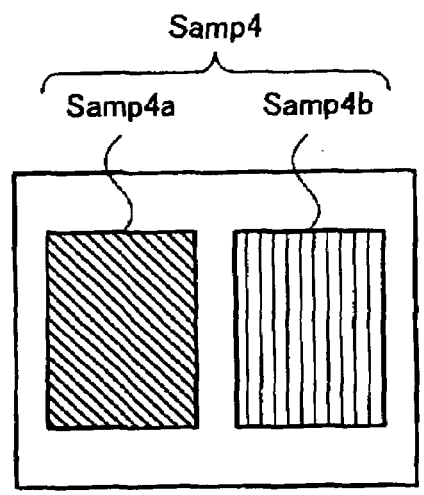
FIG. 6B is a diagram illustrating the fourth image correction method.

FIG. 6B shows a sampling area Samp4 as a target of the statistical value calculation, which is used when the image correcting blocks 50a and 50b perform the image correction. The sampling area Samp4 has sampling areas Samp4a and Samp4b. The sampling area Samp4a is set so as to be completely held in an area of image data GI4a and the sampling area Samp4b is set so as to be completely held in an area of image data GI4b. In this case, the image correcting block 50a, to which image data GI4a is inputted, performs the image correction using the statistical value of image data in the sampling area Samp4a, and the image correcting block 50b, to which image data GI4b is inputted, performs the image correction using the statistical value of image data in the sampling area Samp4b.

Figure 6C:
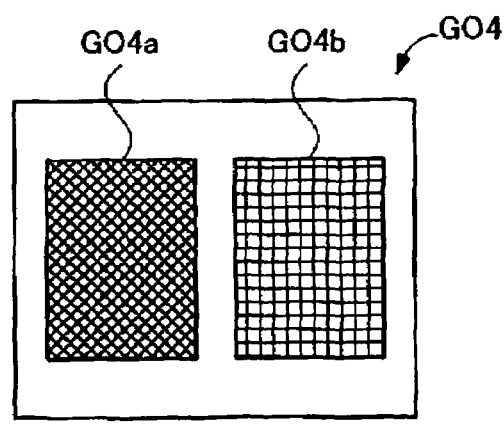
FIG. 6C is a diagram illustrating the fourth image correction method.

FIG. 6C shows image data GO4 outputted from the automatic image correction circuit 100. Image data GO4 includes image data GO4a and GO4b. Image data GO4a is image data obtained by performing the image correction on image data GI4a using only the statistical value of image data in the sampling area Samp4a by the image correcting blocks 50a. Further, image data GO4b is image data obtained by performing the image correction on image data GI4b using only the statistical value of image data in the sampling area Samp4b by the image correcting blocks 50b. As such, when image data about the simultaneous multi-screen display of the video phone or the like is inputted to the automatic image correcting circuit 100, image data GI4a and GI4b to be inputted are different from each other, and thus the statistical value calculating unit 17 is set in the statistical value independent mode. Accordingly, the image correcting blocks 50a and 50b does not total the statistical values calculated from image data GI4a and GI4b. That is, the automatic image correcting circuit 100 performs the image correction separately on image data GI4a and GI4b based on the statistical values obtained in the respective sampling areas Samp4a and Samp4b. By doing so, the automatic image correcting circuit 100 can perform the image correction suitable for respective image data GI4a and GI4b. Moreover, as described above, when receiving-side image data and receiving-side image data are simultaneously displayed in the video phone or the like, a frame rate of image data to be processed may be lowered according to the processing speed of each of the image correcting blocks 50a and 50b.

Modification

Next, an automatic image correcting circuit 10a according to a modification of the invention will be described with reference to FIG. 7.

Figure 7:
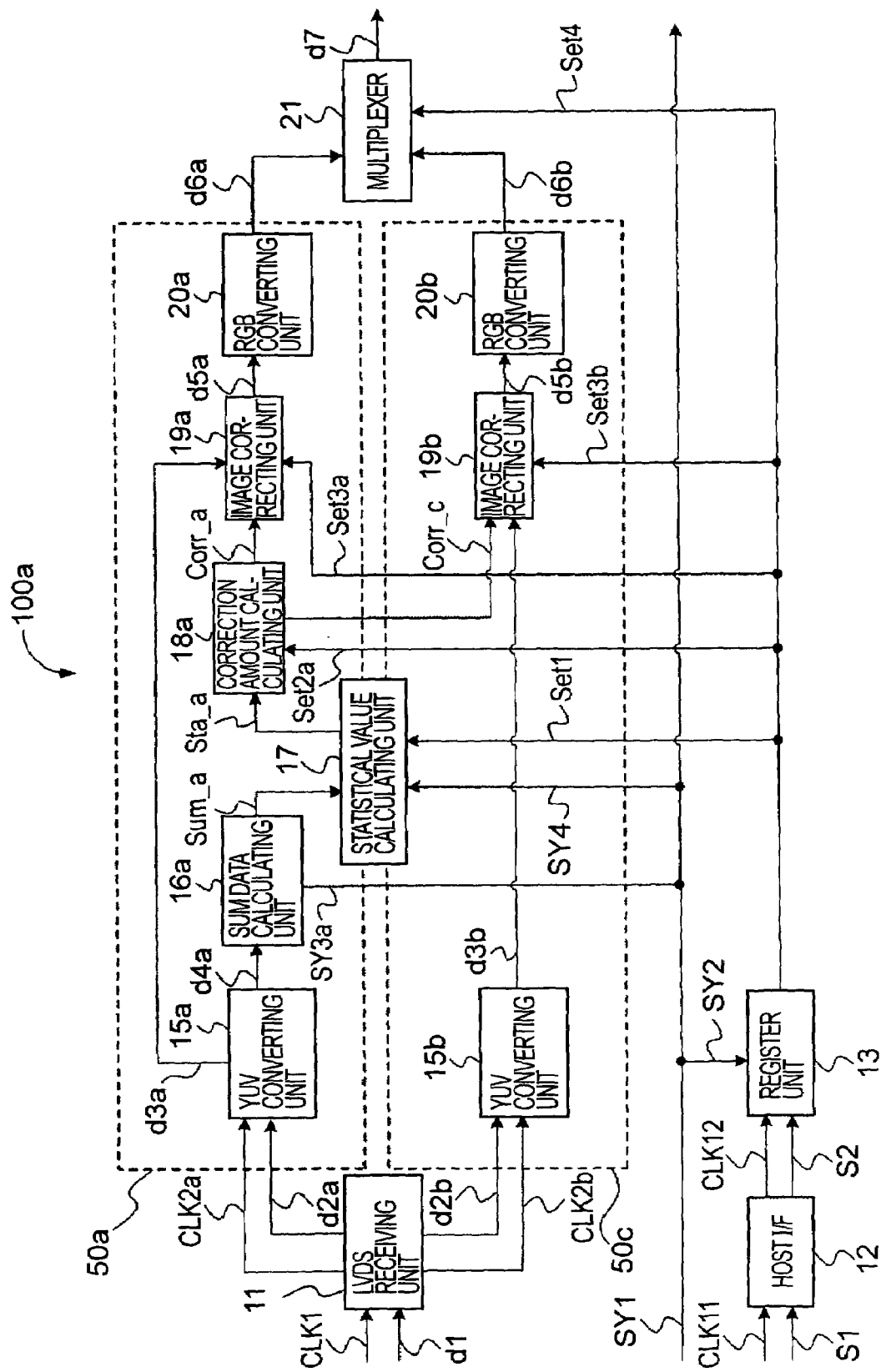
FIG. 7 is a diagram showing a schematic configuration of an automatic image correcting circuit according to a modification of the invention.

FIG. 7 is a circuit block diagram showing the schematic configuration of the automatic image correcting circuit 100a. Similarly to the automatic image correcting circuit 100, the automatic image correcting circuit 100a is a circuit that performs the image correction separately on image data divided into two blocks. Hereinafter, the same parts as those in the above-described automatic image correcting circuit 100 are represented by the same reference numerals and the descriptions thereof will be omitted.

The automatic image correcting circuit 100a is different from the automatic image correcting circuit 100 in that an image correcting block 50c, instead of the image correcting block 50b, is provided. Specifically, the image correcting block 50c performs the image correction using a correction amount Corr_c supplied from the image correction block 50a, without calculating a correction amount based on image data d2b to be inputted thereto. In detail, unlike the image correcting block 50b, the image correcting block 50c does not have the statistical value calculating unit 16b and the correction amount calculating unit 18b and thus does not calculate sum data Sum_b, the statistical value Sta_b, and the correction amount Corr_b. That is, the image correcting block 50c performs the image correction using the correction amount Corr_c, which is the same as the correction amount Corr_a calculated by the correction amount calculating unit 18a of the image correcting block 50a. That is, the automatic image correcting circuit 100a calculates the correction amount from only the statistical value of one of image data divided into two parts and performs the image correction on both of image data divided into two parts using one correction amount.

Specifically, when the image correcting blocks 50a and 50b use sampling areas disposed at different positions, respectively, for example, in a case in which the image correction needs to be effectively performed, in particular, on only image data GI1a in FIG. 2A, the correction amounts do not need to be calculated from both the sampling areas Samp1a and Samp1b. In this case, the statistical value or the like is calculated from only image data in the sampling area Samp1a, and thus the proper image correction can be performed on image data GI1a, without being influenced by image data in the sampling area Samp1b. Further, the above-described processing is effective for a case in which the image correction is performed on only receiving-side image data GI4b when the image correction is performed on an image about the video phone shown in FIGS. 6A to 6C.

Further, when the image correcting blocks 50a and 50b use sampling areas disposed at the substantially same position, as shown in FIGS. 2B, 3B, and 5C, there is a high probability that the statistical values calculated from the image correcting blocks 50a and 50b may be substantially the same. In this case, there may be a case in which a significant error does not occur even when the statistical value calculated from one image correcting block, instead of the statistical values calculated from both the image correcting blocks 50a and 50b, is used for the image correction. Accordingly, the processing of totaling the plurality of calculated statistical values can be omitted, such that the time required for the image correction can be reduced.

Moreover, when the automatic image correcting circuit 100 is made such that the processing in the image correcting block 50b until the statistical value is calculated, specifically, the processing of the sum data calculating unit 16b stops, and the sum data calculating unit 16b of the image correcting block 50b outputs '0' as sum data Sum_b when the statistical value calculating unit 17 totals the statistical values, the substantially same processing as that in the above-described automatic image correcting circuit 10a is performed.

The automatic image correcting circuit 100 may be constructed such that the image correcting block 50b can be switched so as to perform the above-described processing according to image data to be inputted thereto. For example, when input image data d1 is an image which is changed a little over the entire screen, a plurality of statistical values do not need to be calculated by a plurality of blocks. Therefore, the processing of the image correcting block 50b can stop, such that the processing can be simplified.

In the above-described automatic image correcting circuits 100 or 100a, the image correction is performed by two image correcting blocks (the image correcting blocks 50a and 50b or the image correcting blocks 50a and 50c). However, the invention is not limited to this configuration, but the image correction may be performed by three or more blocks. For example, an automatic image correcting circuit can be constructed to have three blocks such that R, G, and B data components of color image data are processed by the respective blocks. Further, an automatic image correcting circuit can be constructed to have four blocks, such that image data is divided into two image data corresponding to the odd-numbered dot clock and the even-numbered dot clock, like the above-described second image correction method, and each of divided image data is processed by two blocks. Similarly, an automatic image correcting circuit can be constructed to have four blocks such that interlaced image data is divided into two image data of a first field image and a second field image, like the above-described third image correction method, and each of divided image data is processed by two blocks.

Electronic Apparatus

Figure 8:
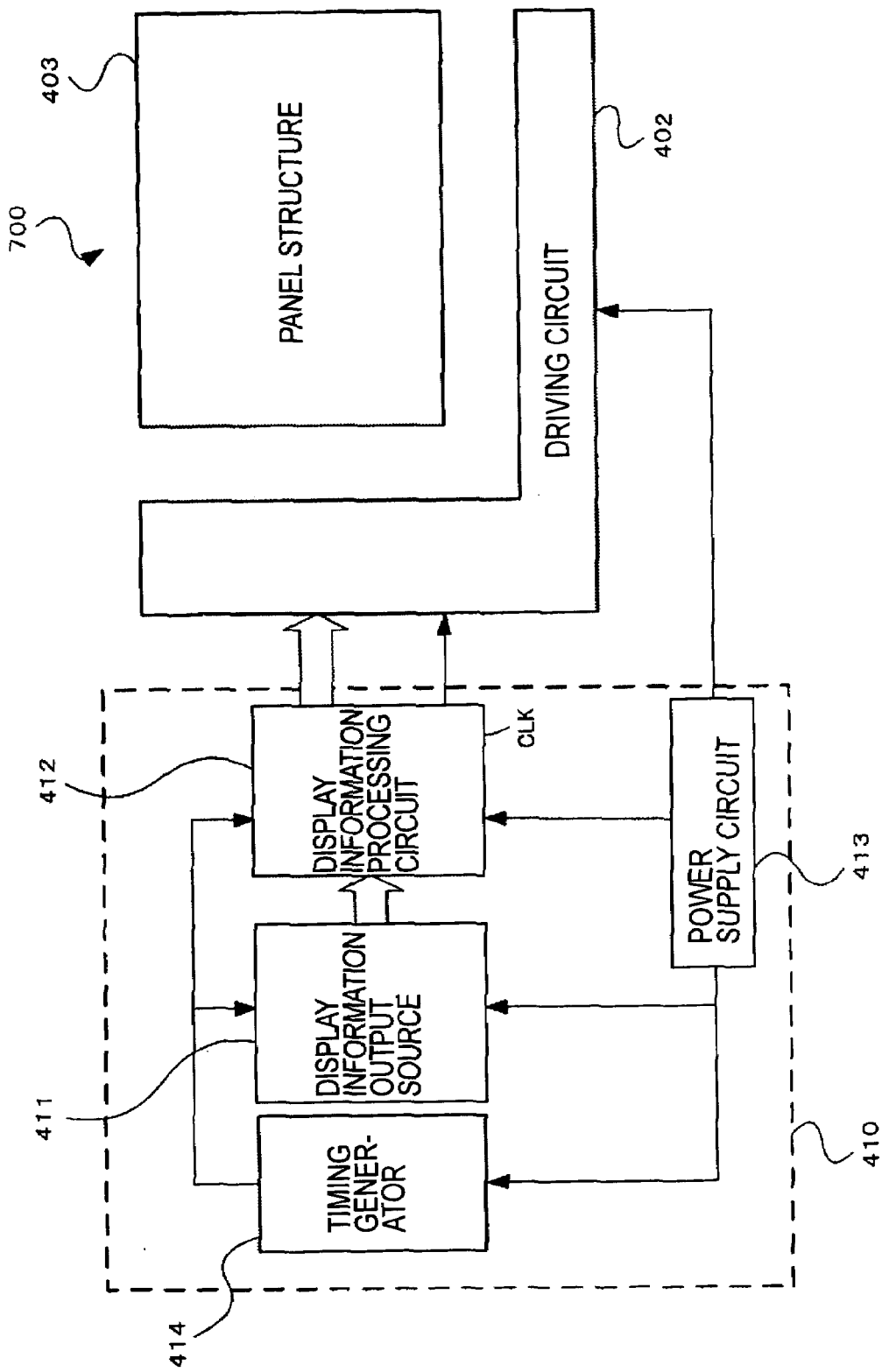
FIG. 8 is a circuit block diagram of an electronic apparatus, to which the automatic image correcting circuit of the invention is applied.

Next, an example of an electronic apparatus, to which the automatic image correcting circuit 100 or 100a of the invention is applied, will be described. FIG. 8 is a diagram schematically showing the overall configuration of the electronic apparatus, to which the invention is applied. The electronic apparatus shown in FIG. 8 has a liquid crystal display device 700 as an image display unit, and a control unit 400 that controls the liquid crystal display device 700. Here, the liquid crystal display device 700 is conceptually divided into a panel structure 403 and a driving circuit 402 having a semiconductor IC and the like. The automatic image correcting circuit 100 or 100a can be provided in the driving unit 402. The control unit 410 has a display information output source 411, a display information processing unit 412, a power supply circuit 413, and a timing generator 414.

The display information output source 411 has a memory that has the ROM (Read Only Memory), the RAM (Random Access Memory), or the like, a storage unit that has a magnetic recording disc, an optical recording disc, or the like, and a tuning circuit that outputs digital image signals in a tuned manner. Further, the display information output source 411 is constructed to supply display information, for example, as image signals having a predetermined format, to the display information processing circuit 412, based on various clock signals generated by the timing generator 414.

The image information processing circuit 412 has various well-known circuits such as a serial-to-parallel conversion circuit, an amplification/inversion circuit, a rotation circuit, a gamma correction circuit, and a clamp circuit. Further, the image information processing circuit 412 processes the display information inputted thereto and supplies image information, together with a clock signal CLK, to the driving circuit 402. The driving circuit 402 has a scanning line driving circuit, a data line driving circuit, and a test circuit. The power supply circuit 413 supplies a predetermined voltage to the above-described parts.

Figure 9A:
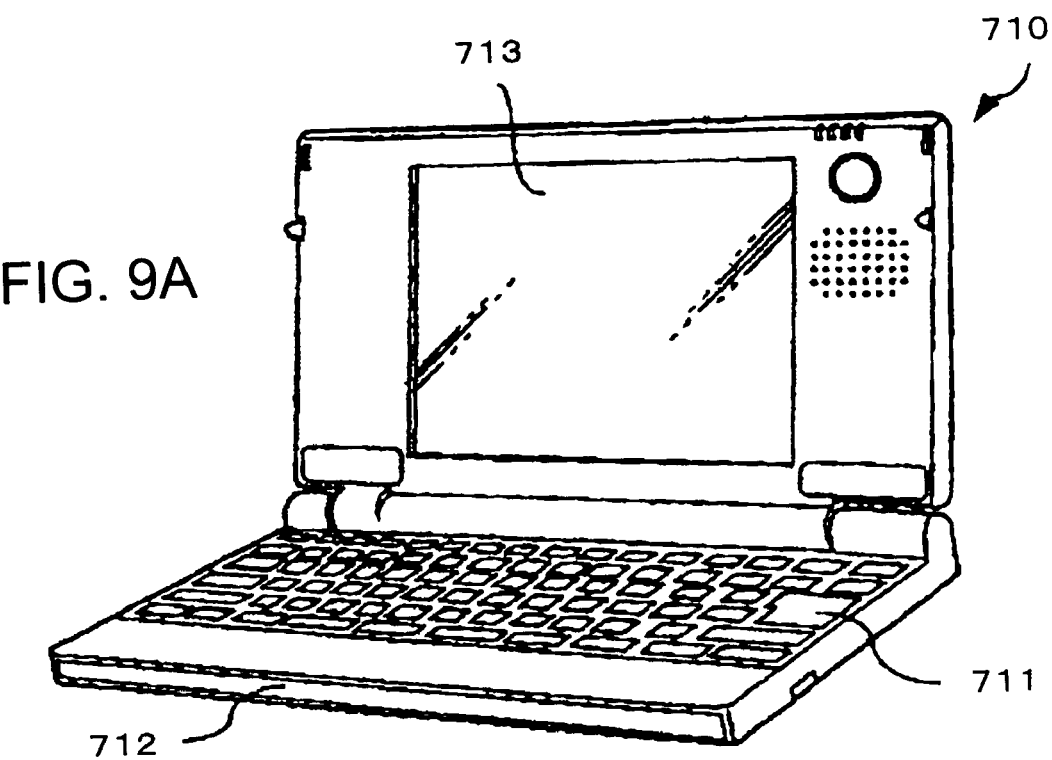
FIG. 9A is a diagram showing an example of an electronic apparatus, to which the automatic image correcting circuit of the invention is applied.
Figure 9B:
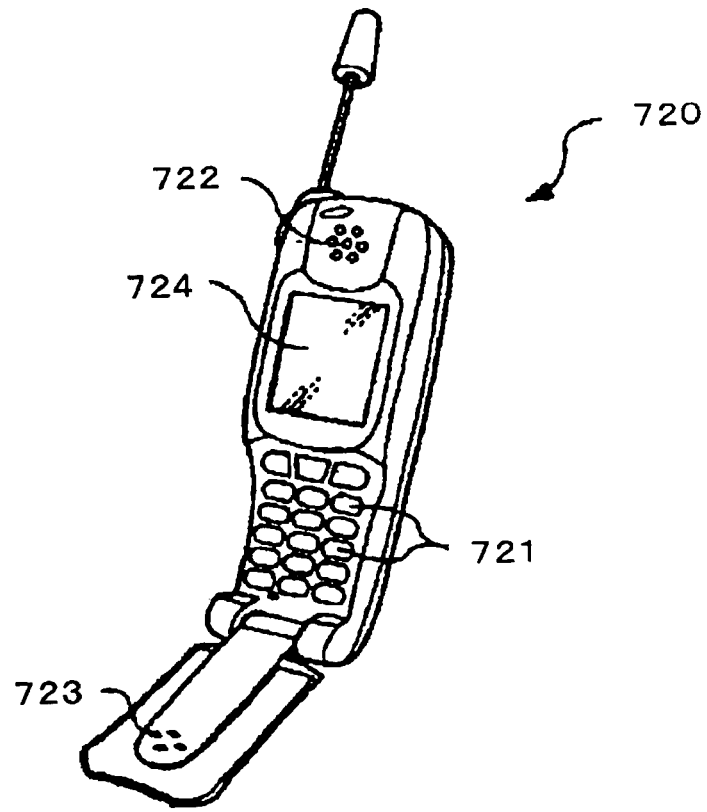
FIG. 9B is a diagram showing an example of an electronic apparatus, to which the automatic image correcting circuit of the invention is applied.

Next, a specified example of an electronic apparatus, to which the invention is applied, will be described with reference to FIGS. 9A and 9B.

First, an example in which the automatic image correcting circuit 100 or 100a is applied to a portable personal computer (a so-called notebook personal computer) will be described. FIG. 9A is a perspective view showing the configuration of the personal computer. As shown in FIG. 9A, the personal computer 710 includes a main body 712 having a keyboard 711, and a display unit 713, to which the liquid crystal display panel according to the invention is applied.

Subsequently, another example in which the automatic image correcting circuit 100 or 100a is applied to a cellular phone will be described. FIG. 9B is a perspective view showing the configuration of the cellular phone. As shown in FIG. 9B, the cellular phone 720 has a plurality of operating buttons 721, a receiver 722, a transmitter 723, and a display unit 724 that uses the liquid crystal display device.

In addition, as an electronic apparatus, to which the automatic image correcting circuit 100 or 100a according to the invention can be applied, a liquid crystal television, a video phone, or the like can be exemplified.

The entire disclosure of Japanese Patent Application No. 2004-254802, filed Sep. 1, 2004, is expressly incorporated by reference herein.

What is claimed is:

1. An electronic apparatus comprising:
   an image display unit including a matrix of pixels that display image detail;
   a first image correcting block corresponding to pixels in a first display region of the image display unit, the first image correcting unit including:
   a first sum data calculating unit that calculates sum data based on a gray-scale value of image data input to the first image correcting block and
   a first image correcting unit that correct input image data based on statistical values;
   a second image correcting block corresponding to pixels in a second display region of the image display unit, the second image correcting unit including:
   a second sum data calculating unit that calculates sum data based on a gray-scale values of image data input to the second image correcting block and
   a second image correcting unit that corrects input image data based on statistical values; and
   a statistical value calculating unit that calculates statistical values based on the sum data from the first sum data calculating unit and from the second sum data calculating unit and outputs statistical values to the first image correcting unit and the second image correcting unit.

2. The automatic image correcting circuit according to claim 1, the statistical value calculating unit calculating a first statistical value by totaling the sum data outputted from the first sum data calculating unit and a second statistical value by totaling the sum data outputted from the second sum data calculating unit and outputting the sum of the first and second statistical values to both the first and second image correcting.

3. The automatic image correcting circuit according to claim 1, the statistical value calculating unit calculating a first statistical value based on sum data outputted from the first sum data calculating unit and a second statistical value based on sum data outputted from the second sum data calculating unit and outputting the first statistical values to the first image correcting unit and the second statistical values to the second image correcting unit.

4. The automatic image correcting circuit according to claim 1, the statistical value calculating unit being operated in a statistical value totaling mode or in a statistical value independent mode according to an external control signal, and in the statistical value totaling mode, the statistical value calculating unit calculates the statistical value by totaling sum data outputted from the first and second sum data calculating units of the first and second image correcting blocks and supplies the same statistical value to both the first and second image correcting blocks, and in the statistical value independent mode, the statistical value calculating unit calculates statistical values based on sum data outputted from the first and second sum data calculating units of the first and second image correcting blocks independently and supplies the statistical values to the corresponding image correcting blocks.

5. The automatic image correcting circuit according to claim 1, wherein the first and second sum data calculating units calculate sum data based on the gray-scale value corresponding to a sampling of an image display unit.

6. The automatic image correcting circuit according to claim 1, further comprising:

an image dividing unit that divides image data acquired from an external source into a plurality of input image data and supplies the plurality of input image data to corresponding ones of the first and second image correcting blocks.

7. An automatic image correcting circuit comprising:
a first image correcting block including:
a sum data calculating unit that calculates sum data based on a gray-scale value of input image data; and
a first image correcting unit that corrects input image data based on statistical values;
a second image correcting block including a second image correcting unit that corrects input image data based on statistical values;
a statistical value calculating unit that calculates a statistical value based on the sum data from the sum data calculating unit of the first image correcting block and that supplies the statistical value to both the first image correcting block and the second image correcting block, the first image correcting unit and the second image correcting unit correcting input image data based on the statistical value from the statistical value calculating unit.

8. An automatic image correcting circuit comprising:
a first image correcting block including:
a first sum data calculating unit that calculates sum data based on a gray scale value of image data input to the first image correcting block and
a first image correcting unit that corrects input image data based on statistical values;
a second image correcting block including:
a second sum data calculating unit that calculates sum data based on a gray-scale value of image data input to the second image correcting block and
a second image correcting unit that corrects input image data based on statistical values;
a statistical value calculating unit that calculates a first statistical value based on the sum data from the first sum data calculating unit and calculates a second statistical value based on the sum data from the second sum data calculating unit; and
a mode setter that selectively sets the statistical value calculating unit to one of a statistical value independent mode and a statistical value totaling mode, wherein the statistical value calculating unit:
when set to the statistical value totaling mode by the mode setter, outputs the first statistical value to the first image correcting unit and outputs the second statistical value separately to the first image correcting unit and
when set to the statistical value totaling mode by the mode setter, adds the first statistical value and the second statistical value together and outputs the sum to both the first image correcting unit and the first image correcting unit.

* * * * *